(12) United States Patent
Lopez et al.

(10) Patent No.: US 9,101,915 B2
(45) Date of Patent: Aug. 11, 2015

(54) CATALYST PARTICLES COMPRISING A LAYERED CORE-SHELL-SHELL STRUCTURE AND METHOD OF THEIR MANUFACTURE

(71) Applicant: UMICORE AG & CO. KG, Hanau-Wolfgang (DE)

(72) Inventors: Marco Lopez, Frankfurt am Main (DE); Dan V. Goia, Potsdam, NY (US); Igor V. Sevonkaev, Potsdam, NY (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 129 days.

(21) Appl. No.: 13/718,973

(22) Filed: Dec. 18, 2012

(65) Prior Publication Data
US 2014/0171290 A1  Jun. 19, 2014

(51) Int. Cl.
| | |
|---|---|
| *B01J 23/00* | (2006.01) |
| *B01J 23/89* | (2006.01) |
| *B01J 37/08* | (2006.01) |
| *B01J 35/00* | (2006.01) |
| *B01J 35/02* | (2006.01) |

(Continued)

(52) U.S. Cl.
CPC ............... *B01J 23/892* (2013.01); *B01J 23/89* (2013.01); *B01J 35/0006* (2013.01); *B01J 35/008* (2013.01); *B01J 35/0086* (2013.01); *B01J 35/023* (2013.01); *B01J 37/08* (2013.01); *H01M 4/921* (2013.01); *H01M 4/926* (2013.01); *H01M 2008/1095* (2013.01); *Y02E 60/50* (2013.01)

(58) Field of Classification Search
CPC ............. B01J 23/54; B01J 23/89; B01J 35/08
USPC ............................. 502/1, 182, 339, 300, 337
See application file for complete search history.

(56) References Cited

U.S. PATENT DOCUMENTS 5,085,693 A   2/1992   Josso et al.

FOREIGN PATENT DOCUMENTS

| EP | 0 423 005 A1 | 4/1991 |
| EP | 2 743 273 A1 | 6/2014 |

OTHER PUBLICATIONS

Gan et al. "Core-Shell Compositional Fine Structures of Dealloyed PtxNi1-x Nanoparticles and Their Impact on Oxygen Reduction Catalysis", Sep. 14, 2012, Nano Letters, 2012, 12 (10), pp. 5423-5430.*

(Continued)

*Primary Examiner* — Colleen Dunn
*Assistant Examiner* — Haytham Soliman
(74) *Attorney, Agent, or Firm* — Levin Santalone LLP; John Santalone (57) ABSTRACT

The present invention is directed to catalyst particles comprising a layered core-shell-shell structure and to a method of their manufacture. The catalyst particles have the general formula BM/IL/PM in which BM is a base metal core (selected from Co, Ni or Cu), PM is a precious metal outer shell (selected from Pt, Ir or Pd) and IL is an intermediate layer comprising a base metal/precious metal alloy with a concentration gradient of base metal to the outside PM layer. The particles of the present invention comprise a core-shell-shell structure and a substantially continuous precious metal shell layer. They find use in various catalytic applications, for example in gas-phase catalysis, in electrocatalysts for fuel cells, in catalytic converters for automobiles and in electronic or medical applications.

12 Claims, 3 Drawing Sheets

(51) Int. Cl.
*H01M 4/92* (2006.01)
*H01M 8/10* (2006.01)

(56) References Cited

OTHER PUBLICATIONS

Felin M G, et al.: "Oxidation-reduction properties of platinum complexes of the amino type," Bulletin of the Academy of Sciences of the USSR, Div. Chem. SC., Bd. 21, Nr. 4, 1972, Seiten 880-882, XP002698522, ISSN: 1573-9171, DOI: 10.1007/BF00854492 (English abstract).

Knyazeva, N. N. et al: "Association of some complexes of platinum(II) and palladium(II) with anions in aqueous solutions", XP002698523, gefunden im STN Database accession No. 1979:410128 (English abstract).

{Phen2}C2O4*2H2O: reaxys registry No. 17015647 (abstract).

* cited by examiner

CATALYST PARTICLES COMPRISING A LAYERED CORE-SHELL-SHELL STRUCTURE AND METHOD OF THEIR MANUFACTURE

BACKGROUND OF THE INVENTION

The present invention is directed to catalyst particles comprising a layered core-shell structure (more specifically defined as a core-shell-shell ("c/s/s") structure) and to a method of their manufacture. The advanced core/shell type particles contain precious metals and find use in various catalytic applications, for example in the preparation of gas-phase catalysts, for the manufacture of electrocatalysts for fuel cells or for the manufacture of catalytic converters for automobiles. They may also be useful in variety of other applications such as, e.g., in electronic or medical applications.

Electrocatalysts for fuel cells are generally based on nanoparticles of platinum or platinum alloys (medium particle size <10 nm), supported on high surface area support materials (e.g. carbon blacks). Carbon supported PtCo or PtNi alloy catalysts are currently used in polymer electrolyte membrane (PEM) fuels cells for mobile applications. To become commercial competitive it is necessary to further reduce the platinum consumption and at the same time to improve the activity and the lifetime of such platinum based catalysts, in particular for mobile PEMFC technology.

It is well known in the art, that only the surface of a catalyst particle promotes the catalytic reaction and the inside core does not contribute to its reactivity. Thus, it should be possible to further reduce the amount of platinum by having it present in a shell at the particle surface. Catalysts of this type are known as core-shell catalysts. Over the past years, such electrocatalysts were described in the literature.

The core-shell-type catalyst particles such as, for example, Pt coated Ni particles (hereinafter abbreviated Ni@Pt for short) or Pt-coated Co particles (Co@Pt), gain increased importance and find use as catalysts for fuel cells or electrode materials for batteries. Especially the particles with a Pt-based shell show a high specific activity. As an advantage, such particles provide a low precious metal content due to the core-shell structure. The catalyst particles are characterized by a high specific mass activity ("SMA") and an improved performance in oxygen reduction reactions ("ORR") at the cathode of PEMFCs or DMFCs (Direct methanol fuel cells).

J. Zhang et al. reported the preparation of core-shell particles as electrocatalysts for oxygen reduction. The core comprises of an alloy of a precious metal, whereas the shell consists of a Pt monolayer deposited by under potential deposition ("UPD"); ref to J. Zhang, F. H. B Lima et al, Journal of Physical Chemistry B Letters, 2005, 109, 22701-22704. The catalyst thus obtained is a $Pt_{ML}X/C$ (X=Au, Ag, Pd; ML=monolayer) with the metal particles comprising an inner core consisting of metal X and a monolayer of platinum in form of a shell on top of it.

Core-shell catalysts comprising a ruthenium core coated with platinum (Ru@Pt) were described some years ago (ref to S. R. Brankovitch, J. X. Wang and R. R. Adzic, Electrochemical and Solid State Letters 2001, 4, A 217). The medium particle size of the Ru@Pt core/shell particles is in the range of 2.5 nm (by TEM).

U.S. Pat. No. 7,053,021 teaches the preparation of carbon-supported core-shell nano-particles of 1-3 nm size comprising a platinum-vanadium-iron alloy. An improvement by the factor of 2-4 is reported. However, this improvement is not sufficient to meet the targets of the auto industry.

Examples for core/shell-type catalysts, primarily for use as electrocatalysts in fuel cells are disclosed in U.S. Pat. No. 8,227,372, U.S. Pat. No. 8,288,308, U.S. Pat. No. 8,304,362 and US 2012/0316054 to the same applicant. These core/shell particles comprise a metal or ceramic core material and at least three atomic layers of platinum in their shell.

WO2012/123442A1 (also published as US2012/0238443A1) to the same applicant is directed to a method for manufacture of metal nanoparticles, in particular to the manufacture of nano-sized base metal particles. The manufacturing method of this invention is based on the "seed particle method" or "seed-mediated method". By this method, size-controlled base metal particles with a medium particle diameter in the range of 20 to 200 nm can be produced using small precious metal seed particles ("nuclei") to initiate the particle formation. Such particles are preferably used as starting material in the present invention.

In summary, the electrocatalyst presently state of the art are not sufficient to meet the performance and cost requirements required for the widespread commercial introduction of fuel cell technology.

It is one objective of the present invention to provide improved core-shell type electrocatalyst materials showing a continuous layer of Pt (or Pt-based alloy) at the outside surface. As a result, a high performance at low platinum loadings, particularly in automotive fuel cell applications should be feasible.

It is a further objective to provide a method for the preparation of such core-shell type catalyst materials. The method should be based on a simple and economic synthesis route; it should be environmentally safe and should be easily scaleable for industrial production.

BRIEF SUMMARY OF THE INVENTION

The present invention provides a novel type of core/shell particles and a method for their manufacture.

In a first aspect, the present invention is directed to catalyst particles comprising a layered core-shell-shell structure according to the general formula (1)

$$BM/IL/PM \qquad (1)$$

in which
BM is a base metal core of the particle,
PM is a precious metal forming the outer shell,
IL is an intermediate layer between the base metal core and the precious metal outer shell comprising a base metal/precious metal alloy of the composition $(BM)_x(PM)_y$ (in which x and y are atomic ratios with x=0.99 to 0.01 and y=0.01 to 0.99; x+y=1), wherein the atomic ratio of the base metal (BM) vs. the precious metal (PM) in the intermediate layer (IL) decreases gradually from the base metal core in the direction to the precious metal (PM) forming the outer shell.

Generally, the base metal (BM) is selected from the group of cobalt (Co), nickel (Ni), copper (Cu) and mixtures and combinations thereof. Preferably the base metal (BM) is nickel (Ni).

The precious metal in the outer shell (PM) is selected from the group consisting of platinum (Pt), palladium (Pd), iridium (Ir) and mixtures, alloys and combinations thereof. Preferably, the outer shell comprises platinum (Pt), a platinum/palladium alloy (PtPd) or a platinum/iridium alloy (PtIr).

In general, the outer shell of the layered core-shell-shell particles of the present invention is substantially continuous and comprises at least one (1) atomic layer of precious metal or precious metal alloy.

Further, the intermediate layer (IL) of the composition $(BM)_x(PM)_y$ comprises at least three (3) atomic layers of base metal/precious metal alloy.

Examples of catalyst particles having a layered core-shell-shell structure according to the present invention are Ni/NiPt/Pt, Co/CoPt/Pt, Cu/CuPt/Pt, Ni/NiPtIr/PtIr, Ni/NiPtPd/PtPd etc.

In a second aspect, the invention is directed to a method of preparation of catalyst particles comprising a layered core-shell-shell structure, comprising the steps A) heating a base metal precursor compound in a polyol solvent system at a temperature in the range of 80 to 120° C., B) heating the reaction mixture at a temperature in the range of 200 to 240° C. (220+−20° C.) to form base metal core particles (BM), C) adding a precious metal precursor compound to the reaction mixture at a temperature in the range of 150 to 190° C. (170+−20° C.), D) cooling the reaction mixture and isolating the particles.

Generally, the base metal precursor compound of step A) is selected from the group of cobalt (Co), nickel (Ni) or copper (Cu) compounds and mixtures and combinations thereof. Preferably the base metal precursor is a nickel (Ni) compound. The precious metal precursor compound added in step C) is selected from the group of platinum (Pt), palladium (Pd) or iridium (Ir) compounds and mixtures and combinations thereof. Preferably, the precious metal precursor compound is a platinum (II) compound.

The precious metal precursor compound added in step C) may further comprise additional precursor compounds of the precious metals selected from the group of iridium (Ir) and palladium (Pd).

The method may further comprise the addition of platinum (Pt) or iridium (Ir) seed compounds in step A) in order to prepare the base metal core material according to the "seed method" described in WO2012/123442A1. Hereby, very small base metal core particles are obtained. However, the addition of seed metal compounds is not necessary, as long as sufficiently small nano-sized base metal particles are obtained.

The core-shell-shell type catalyst particles of the present invention provide several advantages. As one advantage, when used as fuel cell electrocatalysts, they allow a low precious metal consumption in fuel cell electrodes due to the basic core-shell particle structure (in which the catalytically active Pt is only present at the surface of the catalyst particles).

DETAILED DESCRIPTION OF THE INVENTION

As found, the challenge is to prepare atomic layers and thin, continuous films of platinum on base metal particle surfaces. Hereby it is necessary to overcome the inherent tendency of precious metals, in particular platinum, to form agglomerates upon deposition by chemical reduction. Agglomerates may be deposited on the surface of a base metal particle; however, such surfaces are in many cases not dense and continuous. Specifically, when preparing Ni@Pt core-shell particles, the lattice and surface energy dissimilarities of the two metals must be considered.

Thus, in the case of conventionally prepared core-shell catalyst particles, during electrochemical operation, the base metal cores of the catalyst particles may be exposed to the acidic electrolyte of a fuel cell, which then leads to leaching and dissolution of the particle cores. This results in a poor long-term stability and short catalyst lifetime. Moreover, such core/shell particles do not provide the high activity required for automotive fuel cell applications. This invention strives to provide a solution to this challenge.

Key features of the layered core-shell-shell particles of the present invention are now described in more detail.

Figure 1:
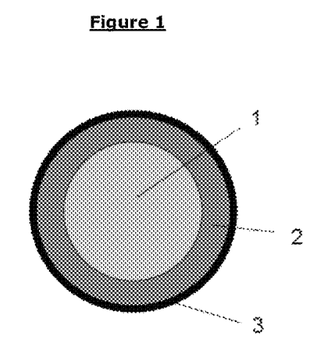
FIG. 1 shows a schematic drawing of a layered core-shell-shell particle according to this invention.

As shown in FIG. 1, the layered core-shell-shell particles are based on a multilayered, preferably 3-layered structure comprising a base metal core (BM core, numeral 1), an intermediate layer (IL, numeral 2) comprising a base metal/precious metal alloy of the composition $(BM)_x(PM)_y$ (wherein x and y are atomic ratios with x=0.99 to 0.01 and y=0.01 to 0.99) and a substantially continuous outer shell layer comprising precious metal (PM shell, numeral 3).

The term "substantially continuous" means a dense layer with good structural integrity attached to the intermediate layer IL, covering >90%, preferably >95% of the surface area of the outer surface of the intermediate layer IL. The structural integrity of the precious metal shell may be determined by CV (cyclovoltammetry). Further details are given in the Experimental section. Occasionally, the outer shell layer of precious metal may have pin holes, structural defects or may show grain boundaries. Further, secondary particles may be attached or agglomerated to its surface.

Basically, the medium particle size (diameter) of the layered core-shell-shell particles is in the range of 10 to 200 nm; preferably in the range of 15 to 150 nm (as detected by TEM).

Typically, the PM shell layer comprises at least one (1) atomic layer of precious metal or precious metal alloy and the intermediate layer (IL) comprises at least three (3) atomic layers of base metal/precious metal alloy of the composition $(BM)_x(PM)_y$.

Thus, the overall thickness of the PM containing shell (i.e. IL+PM shell) should be at least 4 atomic layers of base metal/precious metal ally and precious metal (or precious metal alloy). Practically, the overall thickness should be in the range of 0.7 to 5 nm, preferably in the range of 0.7 to 4 nm, as identified by Fast Fourier Transform (FFT) analysis of a selected image area of a TEM picture.

As a rule, the particles reveal a uniform shape, a narrow size distribution and, in most cases, high crystallinity. Furthermore, the particles contain very low levels of polymer residues or organic contaminants on their surface.

As found by the present inventors, it is possible to obtain core-shell particles having a substantially continuous shell of precious metal (PM), preferably a substantially continuous shell of Pt, by employing the method according to the present invention.

The method for the preparation of the layered core-shell-shell type catalyst particles is now described in more detail.

For best results, the base metal core particles should be generated at temperatures >200° C., preferably in the range of 200 to 240° C. (220+−20° C.). At this temperature range, the surface of the base metal particles (BM) may undergo reconstruction resulting in the formation of pyramidal entities with [1, 1, 1] lattice orientation at the particle surface. Such surface may favor the epitaxial growth of the intermediate layer (IL), having the composition $(BM)_x(PM)_y$, finally resulting in the formation of a pure precious metal layer (PM) at the external surface of the core-shell particle. Similar effects may be detected in the case of Co and Cu particles.

Typically, before step A), the reaction mixture is heated to a temperature in the range of 80 to 120° C. at a heating rate of 0.5 to 1° C./min (heat-up 1). Between step A) and step B), the reaction mixture is heated to a temperature in the range of 200 to 240° C. (220+−20° C.), at a heating rate of 3 to 6° C./min (heat-up 2). In order to reach the temperature regime of step C), the reaction mixture is cooled down after step B) from the temperature of the Ni core formation (220+−20° C.) to the temperature suitable for Pt deposition (170+−20° C.).

In step C), the precious metal precursor compound is slowly added to obtain a gradient growth of the intermediate layer (IL). As a result, in the particle formation, the ratio of the base metal $(BM)_x$ in the intermediate layer (IL) decreases gradually from the base metal core (BM) in the direction to the other precious metal shell. At the same time, the ratio of the precious metal $(PM)_y$ in the intermediate layer is increasing towards the outer shell.

Preferably, the precious metal precursor compound is added in an addition rate of <1 mg PM/min per 100 ml of reaction mixture.

In a further aspect, the method of the present invention is based on the use of certain platinum precursor compounds, in particular low halide containing platinum precursor compounds, wherein platinum is present in the oxidation state +II. Suitable platinum(II) precursor compounds are commercially available as low halide, in particular low chloride containing Pt(II) compounds. An example is platinum(II) tetraammine hydrogencarbonate $[Pt(NH_3)_4(HCO_3)_2]$.

Particularly suitable Pt(II) precursor complexes have the general formula (2) or (3)

(2)

(3)

In these formula, the Pt(II)-complexes (2) and (3) show the coordination number 4 and the indexes have the following meaning:
  L is a neutral monodentate donor ligand,
  L-L is a neutral bidentate donor ligand,
  a is an integer of 1 to 4 and
  b is an integer of 0 to 3, with a+b=4,
  c is 1 or 2
  d is 0 or 2 ist, with 2c+d=4, and
  X is a single or twice negatively charged anionic group and m is 1 or 2.

Preferably L is a nitrogen-containing neutral ligand selected from the group of ammonia $(NH_3)$ or ethanolamine $(HO-C_2H_4-NH_3$, "EA"), preferably L-L is ethylene diamine $(H_2N-C_2H_4-NH_2$, "en"). The anionic group X is preferably selected from the group of carbonate, acetate, sulfate, nitrate, oxalate $(C_2O_4^{2-})$ or hydroxyl $(OH^-)$.

As an example, suitable Pt(II) precursors according to the general formula (a) or (b) are the following Pt(II) complexes, their aqueous compositions and mixtures and combinations thereof:
  platinum(II)-tetraethanolamine carbonate $Pt(EA)_4CO_3$
  platinum(II)-tetraethanolamine hydroxide $Pt(EA)_4(OH)_2$
  platinum(II)-diethylenediamine carbonate $Pt(en)_2CO_3$
  platinum(II)-tetraethanolamine oxalate $Pt(EA)_4(C_2O_4)$.

These complexes are described, inter alia, in pending EP patent application EP1219676.3 ("Method for the manufacture of aqueous compositions of platinum metal group complexes") to the same applicant. They are available from Umicore AG & Co KG, D-63457 Hanau, Germany.

Suitable precursors compounds for Ir are Ir(III) or Ir(IV) compounds such as Ir(III)-acetate $[Ir(CH_3COO)_3]$, $H_2IrCl_6$ or $H_2Ir(OH)_6$; suitable precursor compounds for Pd are Pd(II) compounds such as palladium(II) nitrate $[Pd(NO_3)_2]$ or palladium(II) sulfate $[PdSO_4]$. These compounds are commercially available from different vendors.

It was found that the Pt precursors, in order to be suitable for the method of the present invention, should be stable towards reduction up to a temperature >150° C. in the polyol solvent employed. In other words, in the poly solvents employed, the reduction to metallic platinum should start at temperatures above 150° C. In the present application, this temperature is called "threshold reduction temperature". To the contrary, conventional precursors such as chloroplatinic acid $(H_2PtCl_6)$ or Bis-(ethanolammonium)-hexahydroxo-platinate(IV)-solution $[(HO-C_2H_4-NH_3)_2Pt(OH)_6$ (also called "EA-platinum" $[EA-H^+]_2Pt(OH)_6)$ readily react below 130° C. and cannot be used for the method of the present invention. However, such precursors may be used as seed compounds in step A) of the present invention (in order to prepare the base metal core particles).

A further aspect of the Pt-precursors suitable for the process of the present invention is their potential to be very slowly reduced, by which the classical cluster growth mechanism is prevented. A suitable Pt precursor is characterized by the oxidation state +II, which means the redox potential is low, whereby the reduction rate may be lower compared to Pt-precursors in +IV oxidation state. Secondly, it is well know in the field of chemistry that nitrogen containing ligands (such as ammonia, ethylenediamine or ethanolamine) form stable Pt complexes, in contrast to, e.g., $H_2PtCl_6$.

Figure 2:
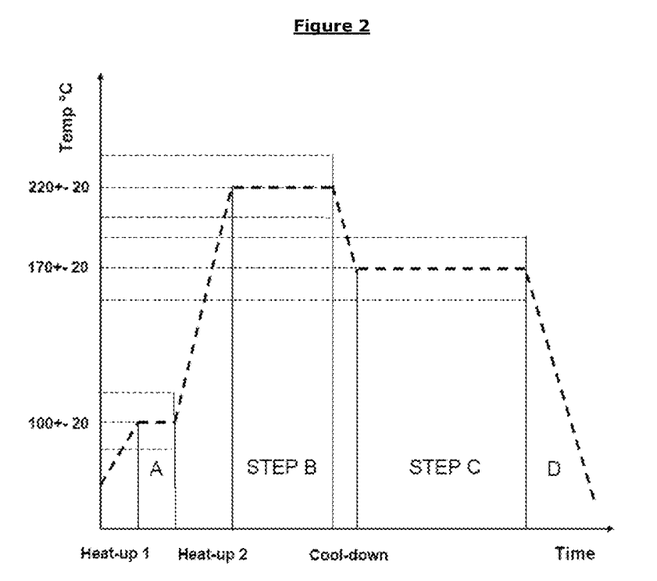
FIG. 2 provides a schematic drawing of the temperature profile employed in the method of the present invention.
Figure 3:
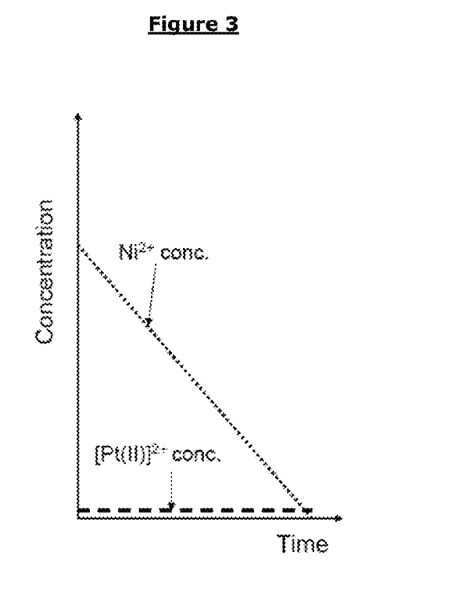
FIG. 3 schematically depicts the changes of the $Ni^{2+}$ and $Pt^{2+}$ concentration in the reaction mixture during the NiPt intermediate layer (IL) and Pt shell formation in step C) of the present invention.

A schematic drawing of the temperature profile employed in the method of the present invention is shown in FIG. 2. The various steps of the method of the present invention are now described in more detail, In step A), the base metal precursor compound is mixed with a polyol solvent system and heated up to a temperature in the range of 80 to 120° C. (100+−20° C.). In this system, the polyol is acting as solvent and as a reducing agent.

Suitable polyol solvents for use in the present invention are ethylene glycol (EG), diethylene glycol (DEG), triethylene glycol (TEG), tetraethylene glycol, polyethylene glycol 200 (PEG 200), 1,2-propylene glycol, 1,3-propylene glycol, dipropylene glycol (DPG) and mixtures and combinations thereof.

Preferably, the boiling point of the polyol system employed should be above 200° C. As long as this condition is verified, small quantities of lower boiling solvents may be added. Furthermore, other organic dispersing agents or surfactants, such as, e.g., triethanolamine, sorbitol, gum arabic or pentaerythritol may be added.

In a preferred embodiment, the method may further comprise the addition of Pt- or Ir-seed compounds in step A) in order to prepare the base metal core particles as described in WO2012/123442A1. In case the seed formation method is employed, the reaction mixture is held at the temperature range of 80 to 120° C. for a period of about 10 to 60 mins. The exact conditions depend on the particle size range needed for the core particles.

Suitable precursor compounds of the base metals should be soluble in the polyol solvent system. Examples are the nitrates, sulfates, carbonates, hydrogen-carbonates and acetates of Co, Ni and Cu. Examples are Cu(II)-carbonate, Ni(II)-carbonate, Co(II)-sulfate, Cu(II)-acetate, Cu(II)-hydrogen-carbonate or Co(II)-carbonate. Other precursor compounds, preferably precious metal precursors having a low halide, especially chloride content, may also be used.

Preferably, the base metal precursor is nickel(II) carbonate, particularly preferred is basic nickel carbonate-tetrahydrate ($NiCO_3 \times 4H_2O$).

Further additives for control of basic or acidic environments and/or for buffering action may be added to the base metal precursor compounds (e.g. $Na_2CO_3$, $K_2CO_3$, $NH_4$ compounds etc). The concentration of the base metal in the polyol reaction mixture should be in the range of 0.5 to 20 g/l, preferably in the range of 1 to 10 g/l.

In step B) the reaction mixture is held at a temperature in the range of 220+−20° C. to form the base metal core particles (BM). This temperature is held for a period of about 2 to 6 hours, preferably 3 to 5 hours, wherein the base metal particles are formed. The time period for heating the reaction mixture is typically in the range of 20 to 40 mins (depending on the batch size). For best results, the heating rate employed between step A) and step B) is in the range of 3 to 5° C./min (heat-up 2).

As mentioned, it has been found that a substantially continuous precious metal shell is obtained, when the base metal core particles are generated in the polyol system at temperatures >200° C., preferably in the range of 200 to 240° C. (220+−20° C.). In the Ni/Pt system, best results and substantially continuous Pt shells are obtained, when the Ni core particles are showing (at least partially) a hexagonal-close-packed (hcp) surface.

In order to reach the temperature regime of step C), the reaction mixture is cooled down after step B) from the temperature of the base metal core formation (220+−20° C.) to the temperature suitable for PM deposition (170+−20° C.). In this temperature range should be the threshold reduction temperature of the precious metal precursor employed. Suitable cool-down rates from step B) to step C) are in the range of 0.1 to 3° C./min, typically they are in the range of about 0.5 to 2° C./min. Once the required temperature range is reached, the precious metal precursor compound is added. Optionally, ultrasonic energy may be applied during the addition of the precious metal precursor.

In step C), the precious metal precursor compound is slowly added to obtain a composition gradient in the intermediate layer (IL). Preferably, the precious metal precursor compound is added in an addition rate of <1 mg PM/min per 100 ml of reaction mixture. In the case of a Pt precursor compound, the addition rate is typically <1 mg Pt/min for reaction mixtures of 100 ml volume. For bigger reaction volumes or scale-up batches, the addition rate of the precious metal precursor compounds has to be adjusted accordingly. By this measure, a gradient in the base metal concentration of the IL of the resulting particles is achieved and the composition $(BM)_x(PM)_y$ (wherein x and y are atomic ratios with x=0.99 to 0.01 and y=0.01 to 0.99; x+y=1) is obtained.

Figure 4:
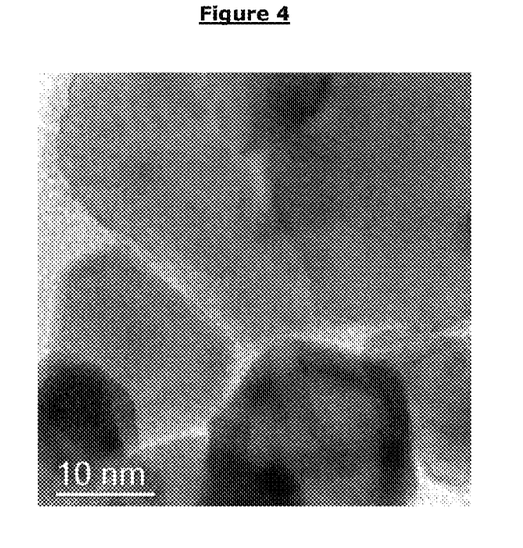
FIG. 4 shows a TEM picture of the particles obtained in Example 3.

As an example, for the formation of Ni/NiPt/Pt particles according to the present invention, FIG. 4 schematically depicts the changes of the $Ni^{2+}$ and $Pt^{2+}$ concentrations in the reaction mixture during the NiPt (IL) and Pt shell formation in step C). As the Pt-precursor is slowly added and reduced, the concentration of the $Pt^{2+}$ ions remains constant. To the contrary, the concentration of $Ni^{2+}$ ions in the reaction mixture is reduced as no additional Ni-precursor is added. Thus, at the end of the addition process in step C), a Pt shell is formed.

In step C) the reaction mixture is maintained at a temperature in the range of 150 to 190° C. (170+−20° C.) for a period of about 10 to 20 hours.

Finally, in step D) the reaction mixture is cooled down and the particles are isolated by methods well known to the skilled person. The resulting core/shell metal particles may be separated from the reaction mixture by conventional separation steps (e.g. filtration, centrifugation, decantation). Further treatment steps, known to the person skilled in the art, may be added (e.g. washing, drying, screening, calcination etc.).

Advantageously, the process is carried out under a protective gas atmosphere, for example under argon (Ar) or nitrogen ($N_2$). A reducing atmosphere (such as forming gas) may also be used. This measure avoids oxidation of the base metal particles and prevents rapid deterioration of the polyol solvents.

The resulting layered core-shell-shell particles contain the base metals cobalt, nickel or copper (or mixtures or alloys thereof); the shell comprises preferably platinum (Pt), iridium (Ir) or palladium (Pd) and mixtures, alloys or combinations thereof. Preferably, in the case of precious metal alloys such as PtIr or PtPd, the total concentration of Ir or Pd in the outer Pt containing shell is in the range of 1 to 10 at.-% (based on platinum metal).

The process of the present invention provides nano-sized core-shell-shell metal particles. Generally, the medium diameter is in the range of 10 to 200 nm, preferably in the range of 15 to 150 nm and particularly preferred in the range of 15 to 100 nm.

The presence of a substantially continuous outer shell layer is demonstrated by the very limited dissolution of the base metal (e.g. nickel) in a subsequent acid leaching step of the layered core-shell-shell particles (e.g. Ni/NiPt/Pt particles) of the present invention. Generally, the base metal core (BM) is preserved from acid attack and dissolution by the dense precious metal (e.g. platinum) layer (reference is also made to CV measurements, Experimental section, Example 3). Thus, catalyst particles showing high catalytic activity and a long lifetime are provided.

The core/shell/shell catalyst particles described in the present invention may be supported on a suitable support material. Suitable support materials are high surface area powdered materials, such as inorganic oxides, ceramic materials, carbon blacks, graphites or organic polymers. Preferably, for the use in electrocatalysts, electrically conductive support materials are used. Preferred electrically conductive support materials are conductive carbon blacks, graphitized carbon blacks, graphites, carbon nanotubes and conductive ceramic materials. Suitable carbon blacks are for example Vulcan XC 72, Ketjenblack EC or Shawinigan Black, which are commercially available from different suppliers. However, many different support materials may be used.

The amount of catalyst particles when supported on the support material (frequently called the "metal loading") is generally in the range of 1 to 90 wt.-%, preferably in the range of 10 to 80 wt.-% and most preferred in the range of 20 to 60 wt.-% (based on the total weight of the resulting electrocatalyst).

The invention is now described in more detail by the following examples, which are to be considered illustrative, but not intended to limit the scope of the invention or the following claims.

Experimental Section

Particle Analysis:

The resulting particles are inspected by Transmission and Scanning electron microscopes (TEM JEM-2010 and FESEM JEOL-7400). In all cases the medium particle size (medium particle diameter) is reported. Crystal structures of the particles are determined by electrodiffraction (JEM-2010) and by X-ray diffraction (XRD Bruker-AXS D8 Focus).

Elemental Analysis:

Elemental analysis is performed by inductive coupled plasma analysis (ICP) using solutions obtained by chemical digestion of the materials.

Acid Leaching Test:

The structural integrity of the Pt shell layer of the core-shell-shell particles can be assessed by acid treatment. If the coating is not complete or has structural defects, the base metal (e.g. Ni) would dissolve coloring the solution in green. Degree of dissolution can be evaluated qualitatively by TEM (by image contrast) and quantitatively by ICP analysis.

For the acid leaching test, the particles are kept in 0.5 M perchloric acid ($HClO_4$) for a minimum of 48 hours at room temperature (25° C.). The resulting acid solution is examined visually; the treated particles are examined by TEM.

Electrochemical Testing:

For electrochemical testing of the catalyst particles, the method of cyclovoltammetry (CV) is applied. A standard rotating disc electrode (RDE) measurement is conducted under protective atmosphere (argon) using a potentiostatic device. Details of the measurement are given in the following section.

Figure 5:
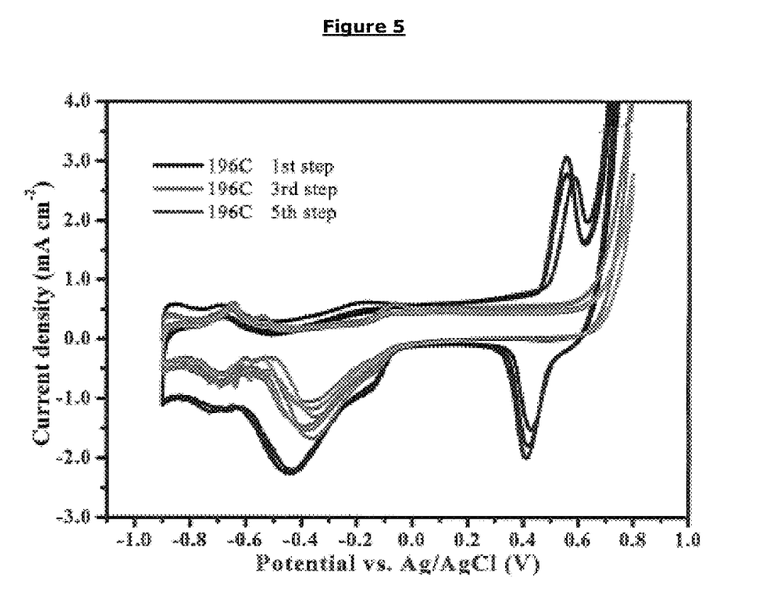
FIG. 5 provides a plot of the cyclovoltammogram (CV) of the core/shell/shell particles according this invention.

The potential (in V) is scanned in a total of five stepwise measurements in an extended range from 0 to +/−1.0 V vs. an Ag/AgCl reference electrode. On the y-axis, the current density (in $mA/cm^2$) is recorded. In the first step, the CV is run in 0.1 M KOH to monitor any Ni present in the sample. In the second step, the CV is run in 0.5 M $HClO_4$ to detect any Ni dissolution. In the third step, the CV is run in 0.1 M KOH again to detect remaining Ni. In the fourth step, the CV of the second step (0.5 M $HClO_4$) is repeated to remove any Ni found in the third step. In the final fifth step, the third step is repeated and the CV is again run in 0.1 M KOH again to detect any remaining Ni. Hereby, the peaks at +0.4 V (associated to the reduction of $Ni^{3+}$ to $Ni^{2+}$) and +0.5 V (associated to the oxidation of $Ni^{2+}$ to $Ni^{3+}$) are detected. A cyclovoltammogram (CV) of a typical sample of Ni/NiPt/Pt particles (BN 196C) is shown in FIG. 5.

Reaction Conditions/Equipment Used:

Reactions are performed in clean glassware under argon or nitrogen protective atmosphere. High purity polyol solvents are employed. Typically a 0.5 L or 1 L round glass reactor with a distiller, heating mantle and temperature control unit is used. Continuous mixing is done at 350-400 RPM.

EXAMPLES

Example 1

Preparation of Core-Shell-Shell Ni/NiPt/Pt Particles a) Preparation of the Platinum Precursor Solution 9.94 g (=1 g Pt) of a water-based solution of the precursor platinum(II)-tetraethanolamine-carbonate [$Pt(EA)_4$]$CO_3$ solution (10.06 wt.-% Pt; Umicore AG & Co KG, Hanau, Germany) is diluted with diethylene glycol (DEG) to 200 ml. The solution is continuously mixed during entire time of the experiment. The final Pt concentration in the precursor solution is 5.0 mg Pt/ml.

b) Preparation Procedure 4.04 g of nickel carbonate (basic nickel carbonate-tetrahydrate ($NiCO_3 \times 4H_2O$; technical grade, 45 wt.-% Ni content; Shepherd Chemical Co., USA) and 0.28 g of pentaerythritol (dispersing agent) are dissolved in a 1:1 mixture of 1,3-propanediol (100 ml) and diethylene glycol (100 ml). The polyol mixture is heated to 80° C. in order to get a uniform dispersion. Then a Ir seeding compound is added (one drop of a hexachloroiridium(IV)acid solution ($H_2IrCl_6$, ca. 24 wt.-% Ir; Umicore AG & Co KG, Hanau, Germany, about 0.024 g Ir). In this period, the seed particles are formed.

Then the temperature control unit is set to 220° C. at 4° C./min rate. Upon reaching the set point (after 25 mins) the timer is started to a countdown of 150 minutes (2.5 hours). In this period the formation of Ni core particles takes place. After these 2.5 hours, additional 30 mins are employed to cool the reactor to 165° C. (at a rate of ~2° C./min). The addition of the Pt precursor solution starts at a rate of 0.5 ml/min (2.5 mg Pt/min). This period takes about 400 min. After the addition of the Pt precursor solution is completed, the reaction mixture is additionally stirred for a total of 20 hours. Thereafter the reactor is cooled to room temperature and the particles are separated and washed repeatedly with water and acetone.

Particle Characterization:

Medium particle diameter (Ni core): ~15 nm

Medium overall particle diameter: ~20 nm

Overall shell thickness (NiPt+Pt): 1.5-2.5 nm

Thickness Pt shell: about 1-3 atomic layers

Thickness NiPt intermediate layer (IL): about 3-8 atomic layers

Acid Leaching Test:

After a treatment of the particles in 0.5 M perchloric acid ($HClO_4$) for a week (168 h) at room temperature (25° C.), only very little Ni core dissolution is found.

Example 2

Preparation of Core-Shell-Shell Ni/NiPt/Pt Particles a) Preparation of the Platinum Precursor Mixture 1.99 g (=1 g Pt) of the precursor compound Pt(II)-tetraammin-hydrogencarbonate [$Pt(NH_3)_4$]$(HCO_3)_2$ (50.19 wt.-% Pt; Umicore AG & Co KG, South Plainfield, N.J. USA; Product code PT-24450) are mixed with 200 ml of diethylene glycol (DEG) at a temperature between 60-80° C. The mixture is continuously stirred and kept at 60° C. during the entire time of the experiment. The final Pt concentration in the precursor mixture is 5 mg Pt/ml.

b) Preparation Procedure 2.22 g of nickel carbonate (Shepard) and 0.1 g of pentaerythritol (dispersing agent) are dissolved in 150 ml of a 1:1 mixture of 1,3-propanediol (75 ml) and diethylene glycol (75 ml). The polyol mixture is heated to 80° C. in order to get a uniform dispersion. Then an Ir seeding compound is added (one drop of a $H_2IrCl_6$ solution; about 0.024 g Ir). In this period, the seed particles are formed.

Then the temperature control unit is set to 220° C. at 4° C./min rate. Upon reaching the set point (after 25 mins) the timer is started to a countdown of 240 minutes (4 hours). The formation of Ni core particles takes place. After 4 hours, additional 30 mins are employed to cool the reactor to 165° C. and additional 0.9 g of pentaerythritol is added. The addition of the Pt precursor solution (concentration 5 mg Pt/ml) starts at a rate of 0.2 ml/min (=1 mg Pt/min). This period takes about 17 hours. After the addition of the Pt precursor solution is completed, the reaction mixture is additionally stirred for a total of ~24 hours. Thereafter the reactor is cooled to room temperature and the particles are separated and washed repeatedly with water and acetone.

Particle Characterization:
Medium particle diameter (Ni core): ~15 nm
Medium overall particle diameter: ~18 nm
Overall shell thickness (NiPt+Pt): 0.7-1.5 nm Example 3

Preparation of Core-Shell-Shell Ni/NiPt/Pt Particles a) Preparation of Platinum Precursor Solution 11.36 g (=1 g Pt) of a water-based solution of the precursor platinum(II)-bisethylenediamine-carbonate [$Pt^{II}(en)_2$]$CO_3$ (8.8 wt.-% Pt; Umicore AG & Co KG, Hanau, Germany) are diluted with diethylene glycol (DEG) to 200 ml. The solution is continuously mixed (350-400 RPM) during entire time of the experiment. The final Pt concentration in the precursor solution is 5 mg Pt/ml.

b) Preparation Procedure 2.22 g of nickel carbonate (Shepard) and 0.1 g of pentaerythrytol (dispersing agent) are mixed together in a 1:1 mixture of propanediol (75 ml) and diethylene glycol (75 ml) at 80° C. for 20 minutes, in order to get a uniform dispersion. Then, a Pt seed material is added (one drop of di(ethanolammonium)-hexahydroxoplatinum(IV) solution; $(EA-H^+)_2Pt^{IV}(OH)_6$ solution, Umicore AG & CO KG, Hanau, Germany); about 0.025 g Pt).

The temperature control unit is set to 115° C. with a heating rate of 0.5° C./min. In this period (step A), the seed particles are formed.

Then the temperature control unit is set to 200° C. at 4° C./min rate. Upon reaching the set point (after 16-17 minutes) the timer is started to a countdown of 300 minutes (5 hours). In this period (step B) the formation of Ni core particles takes place. After 5 hours, additional 0.9 g of pentaerythrytol is added and the reaction mixture is cooled to 180° C. The addition of the Pt precursor solution (5 mg/ml) starts at a rate of 0.2 ml/min (=1 mg Pt/min). This period takes about 17 hours. After the addition of the Pt precursor solution is completed, the reaction mixture is additionally stirred for 20 mins. Thereafter the reactor is cooled to ambient temperature and the particles are separated with a centrifuge, washed repeatedly with water and acetone and dried.

Particle Characterization:
Medium particle diameter (Ni core): ~18 nm
Medium overall particle diameter: ~22 nm
Overall shell thickness (NiPt+Pt: 2-3 nm TEM-Spectroscopy:

A high resolution TEM picture (magnification 500.000×) of the particles is shown in FIG. 4. The figure shows the formation of the Pt shell at the particle surface and the NiPt intermediate layer under it. The composition of the surface is identified by Fast Fourier Transform (FFT) analysis of the selected image area. The thickness of the shell is calculated from the image contrast to about 3-4 nm.

Electrochemical Measurement:

A cyclovoltammogram (CV) of the sample (BN 196C) is shown in FIG. 5. As can be seen, the peaks at +0.4 V (current density –2 $mA/cm^2$) and +0.5 V (current density +3 $mA/cm^2$) disappeared in the third step and in the fifth step of the CV measurement. This indicates a) the absence of any Ni at the surface and b) the presence of a dense Pt layer on the particle surface.

Example 4

Preparation of Core-Shell-Shell Ni/NiPtIr/PtIr Particles a) Preparation of the Platinum/Iridium Precursor Solution 9.94 g (=1 g Pt) of a water-based solution of the precursor platinum(II)-tetraethanolamine-carbonate [$Pt(EA)_4$]$CO_3$ (10.06 wt.-% Pt; Umicore AG & Co KG, Hanau/Germany) are diluted with diethylene glycol (DEG) to 300 ml. The solution is continuously mixed during entire time of the experiment. Thereafter, 2.35 g of Ir(III)-acetate solution (5 wt.-% Ir; 117.6 mg Ir; Umicore AG & Co KG, Hanau, Germany) is added and mixed together. The final PtIr concentration in the precursor solution is 3.72 mg PtIr/ml. The Pt/Ir ratio is ~10:1 (at.-%).

b) Preparation Procedure 2.2 g of nickel carbonate (Shepard) and 1 g of sorbitol (dispersing agent) are mixed together in a 1:1 mixture of 1,2-propanediol (75 ml) and diethylene glycol (75 ml) at 80° C. for 20 minutes in order to get a uniform dispersion. Then, an Ir seed material is added (one drop of an Ir(III) acetate solution, 0.024 g Ir). Then the temperature control unit is set to 220° C. at 4° C./min rate. Upon reaching the set point (after 16-17 minutes) the mixing is continued for 4 hours at 180° C. In this period the formation of Ni core particles takes place. Thereafter, the reactor is cooled to 165° C. and the addition of the PtIr precursor solution (3.3 mg Pt/ml, 0.33 mg Ir/ml) starts at a rate of 0.3 ml/min (=1 mg Pt/min and 0.1 mg Ir/min). This period takes about 17 hours. After the addition of the PtIr precursor solution is completed, the reactor is cooled to and the particles are separated with a centrifuge, washed repeatedly with water and acetone and dried.

Figure 6:
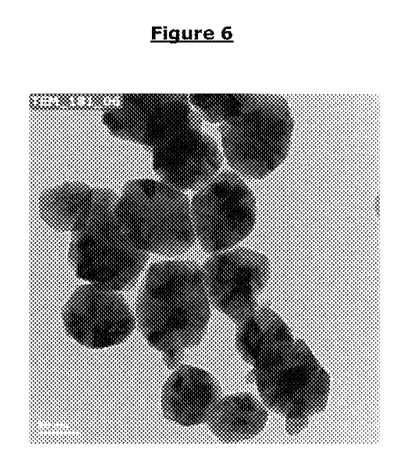
FIG. 6 shows a TEM picture of the particles obtained in Example 4.

FIG. 6 shows a TEM picture of the Ni core particles coated with a PtIr shell layer.

Particle Characteristics:
Medium particle diameter (Ni core): ~20 nm
Medium overall particle diameter: ~25 nm
Overall shell thickness (NiPtIr+PtIr): ~1-3 nm
Pt/Ir ratio (in shell) ~10:1 (at.-%)

What is claimed is:

1. Catalyst particles comprising a layered core-shell-shell structure having a layer sequence of:

BM core/IL/PM outer shell in which
BM core is a base metal core of the particle consisting essentially of a base metal (BM),
PM outer shell is a precious metal outer shell consisting essentially of a precious metal (PM), and
IL is an intermediate layer between the base metal core and the precious metal outer shell comprising a base metal/precious metal alloy of the composition $(BM)_x(PM)_y$ (in which x and y are atomic ratios with x=0.99 to 0.01 and y=0.01 to 0.99; x+y=1),
wherein the atomic ratio of the base metal (BM) vs. the precious metal (PM) in the intermediate layer (IL) decreases gradually from the base metal core in the direction to the precious metal outer shell.

2. The catalyst particles according to claim 1, wherein base metal (BM) is selected from the group consisting of cobalt (Co), nickel (Ni), copper (Cu) and mixtures and combinations thereof.

3. The catalyst particles according to claim 1, wherein the base metal (BM) is nickel (Ni).

4. The catalyst particles according to claim 1, wherein the precious metal forming the outer shell is selected from the group consisting of platinum (Pt), palladium (Pd), iridium (Ir) and mixtures, alloys and combinations thereof.

5. The catalyst particles according to claim 1, wherein the precious metal outer shell is a substantially continuous layer.

6. The catalyst particles according to claim 1, wherein the outer shell comprises at least 1 atomic layer of precious metal or precious metal alloy.

7. The catalyst particles according to claim 1, wherein the intermediate layer (IL) comprises at least 3 atomic layers of base metal/precious metal alloy $(BM)_x(PM)_y$.

8. The catalyst particles according to claim 1, wherein the precious metal forming the outer shell is grown epitaxially to the intermediate layer (IL).

9. The catalyst particles according to claim 1, wherein the medium particle size is in the range of 10 to 200 nm.

10. Catalyst compositions for electrochemical applications comprising the catalyst particles according to claim 1.

11. The catalyst compositions according to claim 10, wherein the catalyst particles are supported on a support material.

12. The catalyst compositions according to claim 11, wherein the support material is selected from the group consisting of conductive carbon blacks, graphitized carbon blacks, graphites, carbon nanotubes, conductive ceramic materials and mixtures and combinations thereof.

\* \* \* \* \*